United States Patent [19]
Yoshimura et al.

[11] Patent Number: 5,585,934
[45] Date of Patent: Dec. 17, 1996

[54] VIDEO SIGNAL RECORDING APPARATUS CAPABLE OF MOTION-IMAGE AND STILL-IMAGE RECORDING

[75] Inventors: Katsuji Yoshimura; Koji Takahashi, both of Kanagawa-ken; Yuji Imamura, Tokyo; Kenichi Nagasawa, Kanagawa-ken; Yasutomo Suzuki, Kanagawa-ken, all of Japan

[73] Assignee: Canon Kabushiki Kaisha, Tokyo, Japan

[21] Appl. No.: 488,954

[22] Filed: Jun. 7, 1995

Related U.S. Application Data

[63] Continuation of Ser. No. 159,948, Nov. 30, 1993, abandoned, which is a continuation of Ser. No. 11,108, Jan. 29, 1993, abandoned, which is a continuation of Ser. No. 701,300, May 13, 1991, abandoned, which is a continuation of Ser. No. 197,850, May 24, 1988, abandoned.

[30] Foreign Application Priority Data

May 26, 1987 [JP] Japan ................... 62-129279

[51] Int. Cl.⁶ .................................. H04N 5/76
[52] U.S. Cl. .................. 386/120; 358/906; 386/121
[58] Field of Search ...................... 358/335, 906, 358/909.1, 342, 310; 360/33.1, 35.1; 348/565, 567; H04N 5/76

[56] References Cited

U.S. PATENT DOCUMENTS

| | | | |
|---|---|---|---|
| 4,415,937 | 11/1983 | Nishizawa et al. | 358/906 |
| 4,656,527 | 4/1987 | Uchimi | 358/310 |
| 4,668,998 | 5/1987 | Aoki | 360/10.3 |
| 4,691,253 | 9/1987 | Silver | 358/335 |
| 4,729,027 | 3/1988 | Hakamada et al. | 348/564 |
| 4,819,101 | 4/1989 | Lemelson | 328/906 |
| 4,858,032 | 8/1989 | Okada et al. | 358/335 |
| 4,870,509 | 9/1989 | Nagasawa et al. | 360/9.1 |
| 4,887,169 | 12/1989 | Bannal et al. | 358/335 |
| 5,097,363 | 3/1992 | Takei et al. | 358/906 |
| 5,379,159 | 1/1995 | Lemelson | 358/906 |

*Primary Examiner*—Thai Q. Tran
*Assistant Examiner*—Huy Nguyen
*Attorney, Agent, or Firm*—Robin, Blecker, Daley & Driscoll

[57] ABSTRACT

An image signal recording apparatus arranged to be selectively set in a still-image recording mode and a motion-picture recording mode. A storage memory stores on picture portion of the motion-picture video signal. During the still-image recording mode, the content of the storage memory is repetitively read out of the storage memory thereby forming a video signal representing the still-image. The duration of still-image recording mode is longer than a period required to store two picture portions of the motion-picture in the storage memory.

20 Claims, 5 Drawing Sheets

VIDEO SIGNAL RECORDING APPARATUS CAPABLE OF MOTION-IMAGE AND STILL-IMAGE RECORDING

This is a continuation application under 37 CFR 1.62 of prior application Ser. No. 08/159,948, filed Nov. 30, 1993, abandoned, which is a continuation of U.S. Ser. No. 08/011,108, filed Jan. 29, 1993, abandoned, which is a continuation of U.S. Ser. No. 07/701,300, filed May 13, 1991, abandoned, which is a continuation of U.S. Ser. No. 07/197,850, filed May 24, 1988, abandoned.

BACKGROUND OF THE INVENTION

1. Field of the Invention

The present invention relates generally to image recording apparatus and, more particularly, to an image recording apparatus capable of effecting both still-image recording and motion-image recording.

2. Description of the Related Art

One-piece camera/VTRs (camcorders) are widely used as one type of image recording and reproducing apparatus. The constructions of recording and reproducing systems generally incorporated in such an apparatus are shown in FIGS. 1 and 2, respectively.

Figure 1:
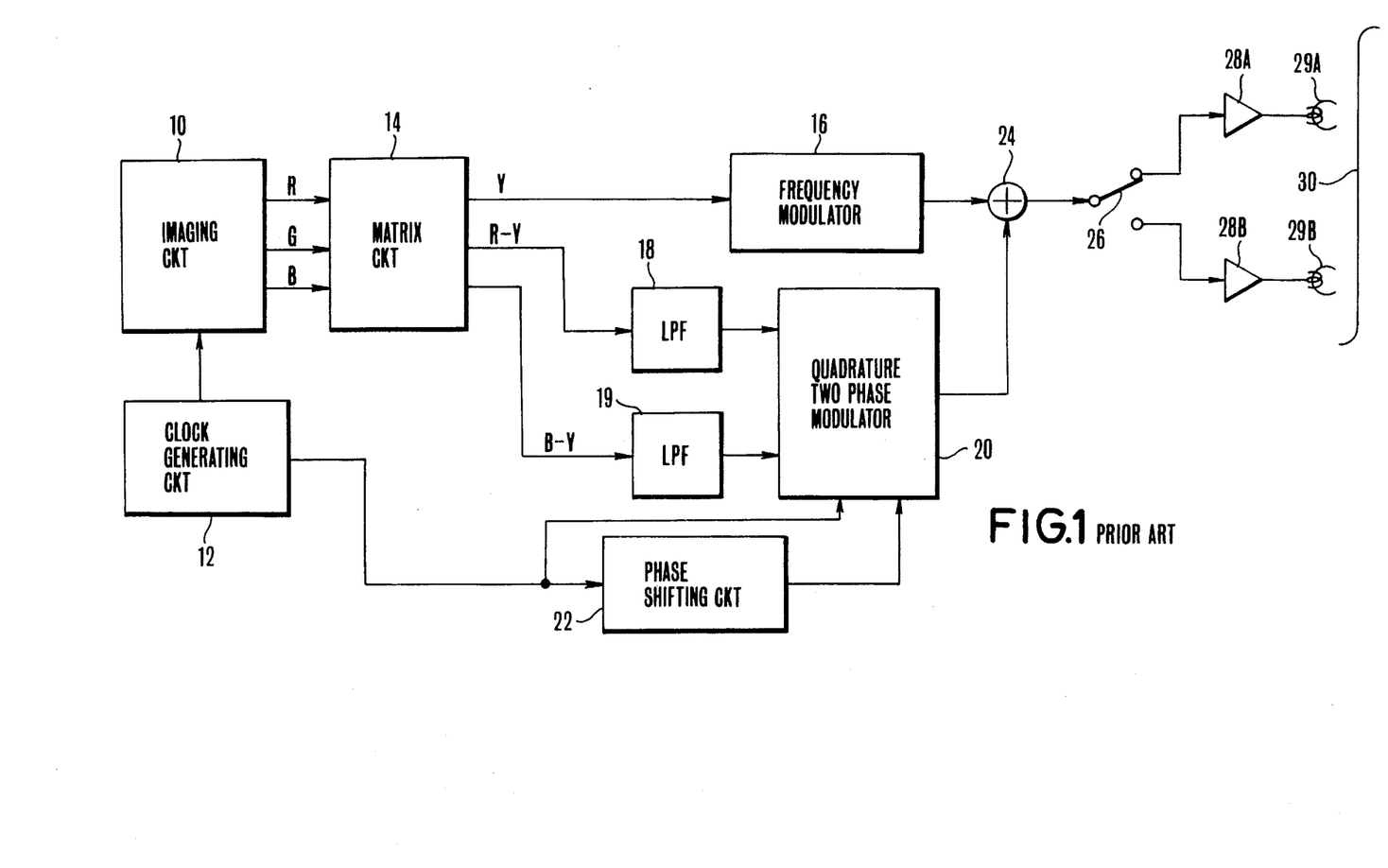
FIG. 1 is a block diagram showing the construction of the recording system of a conventional type of one-piece camera/VTR.

Referring first to FIG. 1, an imaging circuit 10 constituted by a pickup tube or a solid-state imaging device and associated circuits is driven by clock signals generated by a clock generating circuit 12 to output R, G and B signals. A matrix circuit 14 generates a luminance signal Y (=0.3R+0.59G+0.11B) and two color-difference signals (R-Y) and (B-Y) from the R, G and B signals. The luminance signal Y is frequency-modulated in a frequency modulator 16. The color-difference signals (R-Y) and (B-Y) are respectively limited to a bandwidth of 0 to about 500 kHz by low-pass filters (LPFs) 18 and 19. A quadrature two phase modulator 20 effects quadrature two phase modulation of the outputs of the LPFs 18 and 19 by using a low-index carrier wave (629 kHz in the VHS system) supplied from the clock generating circuit 12 and a signal which is 90° phase-shifted with respect to the low-index carrier wave by a phase-shifting circuit 22.

A mixer 24 effects the frequency multiplexing of the frequency-modulated luminance signal Y and the low-index carrier chrominance signal received from the quadrature two phase modulator 20. A switch 26 is switched over at intervals of the reciprocal of a field frequency (for example, every 1/60 seconds in the NTSC system). Therefore, the output of the mixer 24 is applied alternately at intervals of one field to a recording/reproducing magnetic head 29A through a recording amplifier 28A or a recording/reproducing magnetic head 29B through a recording amplifier 28B, and is recorded on a magnetic tape 30.

Figure 2:
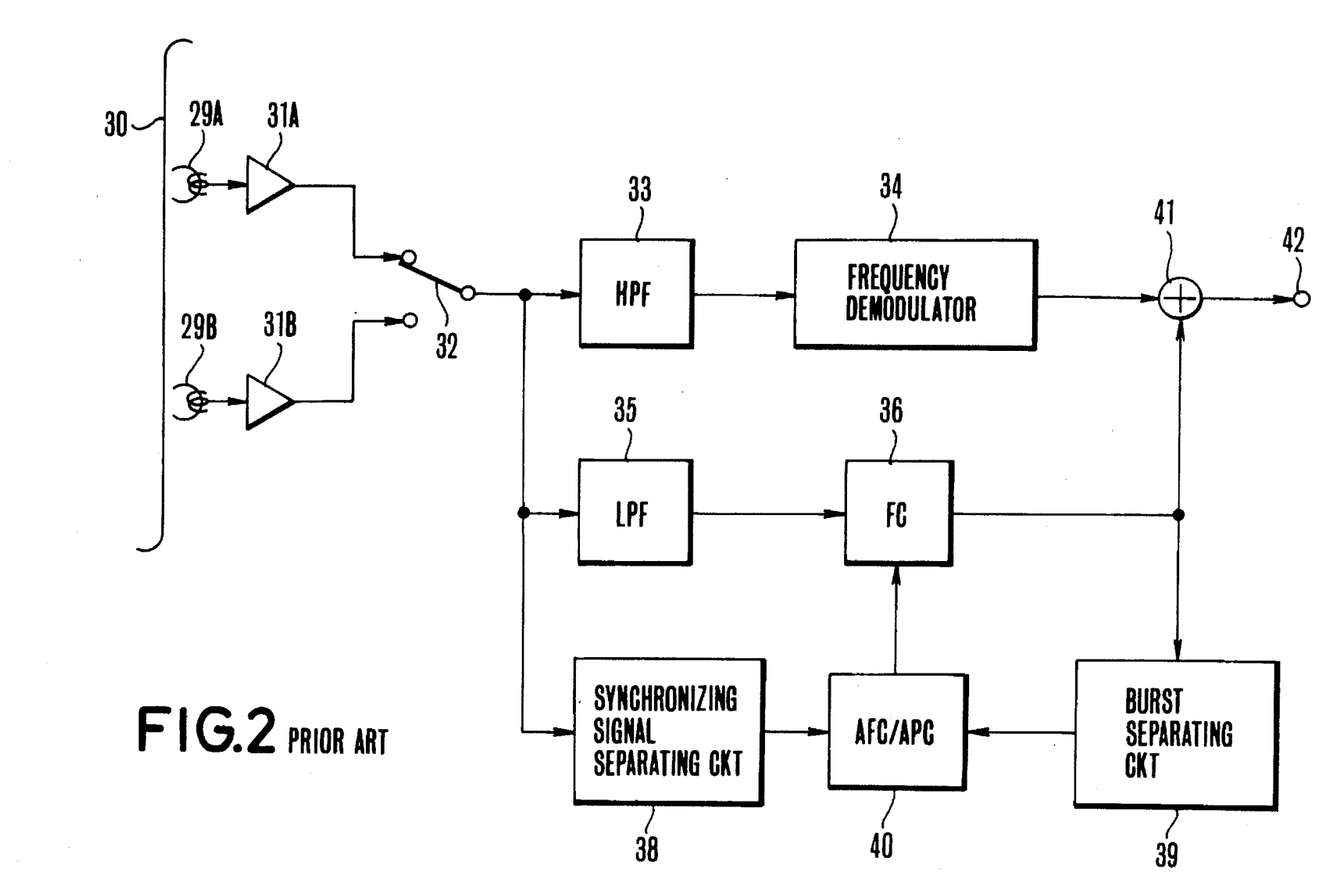
FIG. 2 is a block diagram showing the construction of the reproducing system of the conventional type of one-piece camera/VTR whose recording system is shown in FIG. 1.

The signals recorded on the magnetic tape 30 are reproduced by the reproducing system shown in FIG. 2. A signal reproduced by the magnetic head 29A is supplied through a reproducing amplifier 31A to one contact of a switch 32, while a signal reproduced by the magnetic head 29B is supplied through a reproducing amplifier 31B to the other contact of the switch 32. The switch 32 is switched over alternately at intervals of 1/60 seconds, similarly to the switch 26 of the recording system. A frequency-modulated luminance signal component transmitted through a high-pass filter (HPF) 33 is demodulated into the original baseband signal by a frequency demodulator 34. A low-index carrier chrominance signal component is transmitted through an LPF 35 and, in turn, is converted into a carrier chrominance signal of a 3.58-MHz carrier frequency by a frequency converter 36. A synchronizing signal separating circuit 38 separates a horizontal synchronizing signal from the reproduced signal, and a burst separating circuit 39 separates a color burst signal from the output signals of the frequency converter 36. An AFC/APC circuit 40 receives the horizontal synchronizing signal from the synchronizing signal separating circuit 38 and the color burst signal from the burst separating circuit 39, and forms a clock signal which follows time-base variations in the reproduced output, and then supplies the clock signal to the frequency converter 36 as a carrier wave.

A mixer 41 mixes the output of the frequency demodulator 34 with the output of the frequency converter 36 to provide the mixed signal at an output terminal 42.

In recent years, VTRs of a type known as "high-band β" or "S-VHS" have achieved high-resolution images by enhancing a carrier frequency used in frequency-modulating a luminance signal. In combination with the increased-density arrangement of imaging devices, such improvement has recently made it possible to record and reproduce images which are not inferior in quality to still images obtained with still video cameras.

As one-piece camera/VTRs (camcorders) have been widely used, the amusement value of video imaging has received wide recognition, and a number of consumers have recently been desirous not only of recording and reproducing a scene as a motion image but also of recording and reproducing a portion of the motion image as a still image.

Current VTRs usually include a "still reproduction" mode in which a desired portion of a motion image can be substantially stopped to provide observation of the corresponding still image. However, since a capstan motor must be stopped while shifting from normal reproduction to still reproduction, the quality of the reproduced still image deteriorates to some extent. In addition, since exact tracing is difficult to achieve owing to differences in the inclination of the scanning locus of a video head in successive scanning operations, a drop in S/N ratio occurs at the top and bottom of an image screen. These problems have made it impossible for consumers to view high-quality still images.

To overcome the above-described problems, the present applicant previously proposed in U.S. patent application Ser. No. 937,872 an apparatus arranged to form a still-image recording area separate from a motion-image recording area on an identical recording medium so that the period required for PCM still image information to be recorded On the still-image recording area is several seconds per frame.

In accordance with the above proposal, it is possible to provide an apparatus which can handle both motion images and still images as well as record and reproduce extremely-high-quality still images. However, the apparatus according to this proposal requires separate formation of a motion-image recording area and a still-picture recording area and hence separate arrangement of signal processing circuits for these areas. For this reason, it is difficult to avoid the problem that the size of the apparatus is relatively large.

It is to be noted that the related art of the present invention is disclosed in U.S. Pat. No. 4,415,937.

SUMMARY OF THE INVENTION

It is therefore an object of the present invention to provide an image signal recording apparatus capable of effecting both motion-image recording and still-image recording by means of a relatively simple construction.

It is another object of the present invention to provide an image signal recording apparatus capable of effecting both motion-image recording and still-image recording without the need to form a separate recording area for a still image.

It is still another object of the present invention to provide an image signal recording apparatus capable of effecting both motion-image recording and still-image recording without the need for a separate signal processing circuit for still images.

To achieve the above and other objects, there is provided, in accordance with a non-limitative embodiment of the present invention, an image signal recording apparatus comprising generation means for generating video signals representative of a motion image; storage means for storing the video signals generated from the generation means, the storage means having a storage capacity equivalent to at least one field; writing control means for controlling the timing of the writing of the video signals generated by the generation means into the storage means; reading control means for controlling the storage means so as to repetitively read out the video signals stored in the storage means; and recording means for selectively recording on a recording medium one of the video signals output from the storage means and the video signals generated from the generation means.

The above and other objects, features and advantages of the present invention will become apparent from the following description of a preferred embodiment of the present invention, taken with reference to the accompanying drawings.

DETAILED DESCRIPTION OF THE PREFERRED EMBODIMENT

One preferred embodiment of the present invention will be described below with specific reference to FIGS. 3 to 5.

Figure 3:
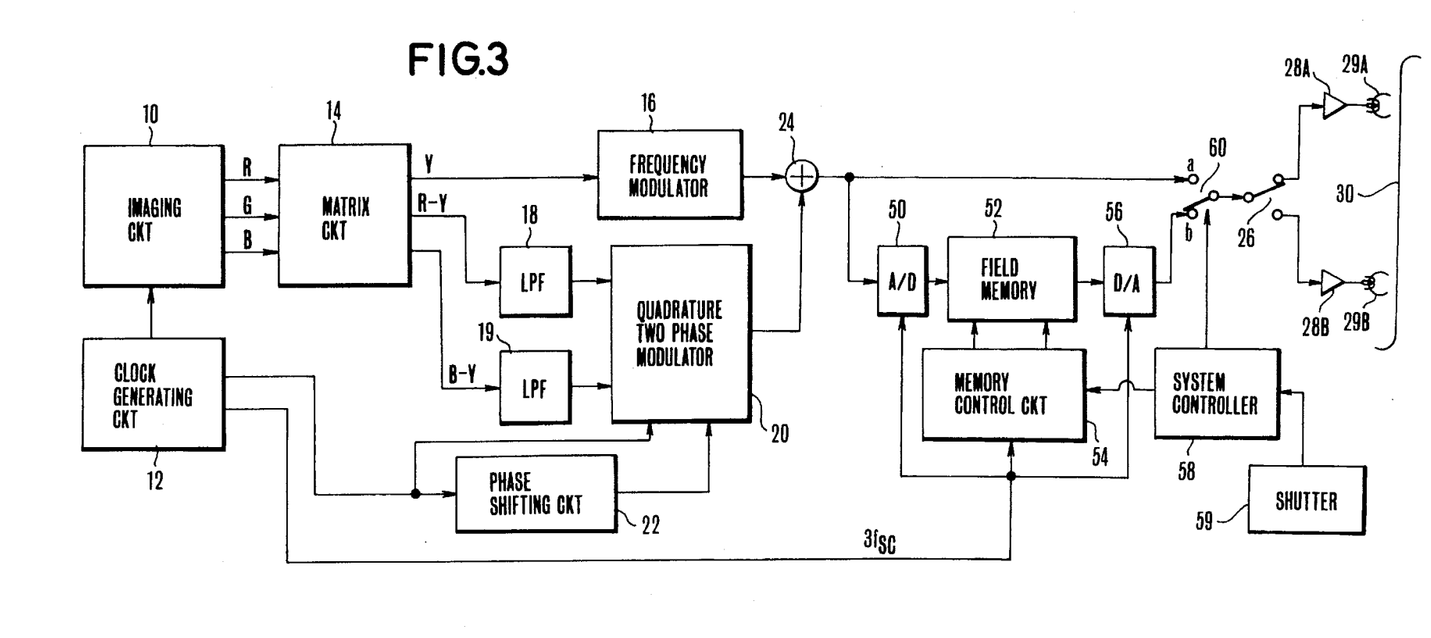
FIG. 3 is a block diagram showing the construction of the recording system of an apparatus according to one embodiment of the present invention.
Figure 4:
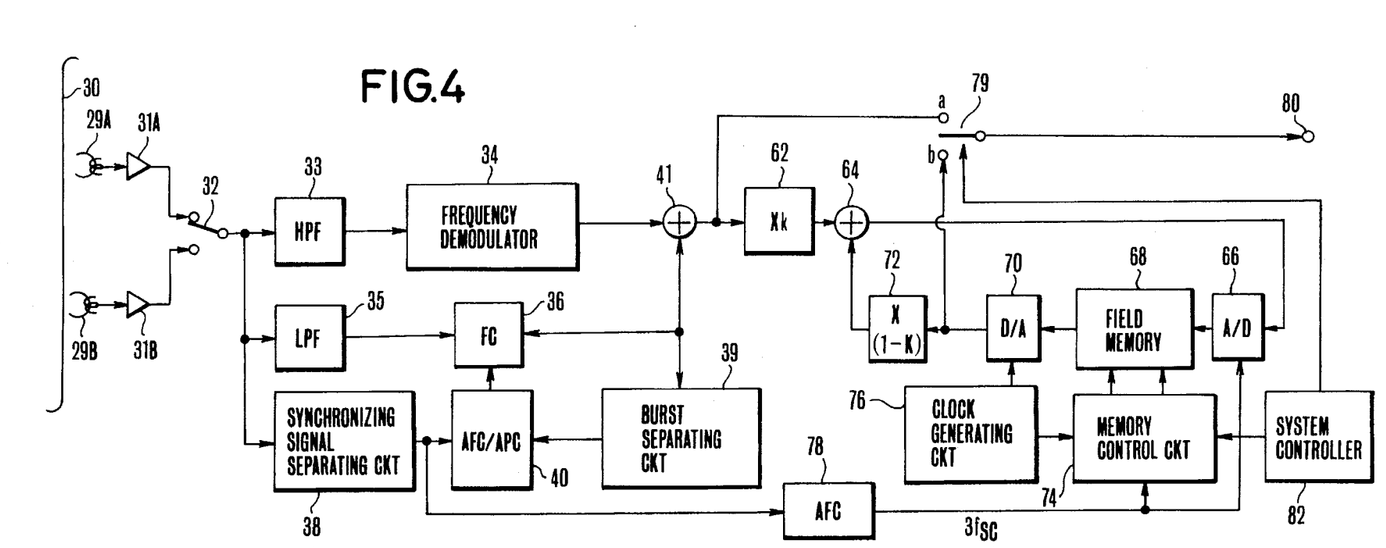
FIG. 4 is a block diagram showing the construction of the reproducing system corresponding to the recording system shown in FIG. 3.

FIG. 3 is a block diagram showing the construction of the recording system of an apparatus according to the embodiment of the present invention with FIG. 4 being a block diagram showing the construction of the reproducing system corresponding to the recording system. In FIGS. 3 and 4, like reference numerals are used to denote the like or corresponding constituent elements shown in FIGS. 1 and 2.

The recording system shown in FIG. 3 comprises, in addition to the elements shown in FIG. 1, an A/D converter 50 for converting an incoming analog signal into an 8-bit digital signal on the basis of a 3-$f_{sc}$ clock signal generated by the clock generating circuit 12 ($f_{sc}$: color subcarrier frequency); a field memory 52 having a storage capacity equivalent to one field; a memory control circuit 54 for controlling writing to and reading from the field memory 52 as well as addresses therefor; a D/A converter 56 for converting digital output signals from the field memory 52 into analog signals on the basis of a 3-$f_{sc}$ clock signal generated by the clock generating circuit 12; a system controller 58 for collectively controlling the circuit of each of the blocks shown in FIG. 3; a shutter 59; and a switch 60 adapted to be connected to a contact a in the motion-image recording mode and to a contact b in the still-image recording mode. The reason why the switch 60 is switched to the contact a in the motion-image recording mode is to prevent the quality of signals from being deteriorated by the A/D converter 50 and the D/A converter 56. If such deterioration in signal quality is negligible, motion-image recording and still-image recording may be controlled merely by controlling writing to and reading from the field memory 52. In this case, the switch 60 is not needed.

The operation of the recording system shown in FIG. 3 will be described below. The output of the mixer 24 is supplied to the contact a of the switch 60 and the A/D converter 50. The digital output of the A/D converter 50 is sequentially written into the field memory 52 under the control of the memory control circuit 54. The signals stored in the field memory 52 are read out as required, and the read-out signals are converted into analog signals by the D/A converter 56.

When the motion-image recording mode is selected, the switch 60 is connected to the contact a by the system controller 58. Thus, the output of the mixer 24 is applied to the recording head 29A or 29B through the switches 60 and 26 and the recording amplifier 28A or 28B, and is thus recorded on the magnetic tape 30.

When, at an arbitrary point in time, an operator issues an instruction for still-image recording, as by operating the shutter 59, the system controller 58 causes the switch 60 to be switched to the contact b and sends an instruction signal for still-image recording to the memory control circuit 54. In accordance with the instruction signal, the memory control circuit 54 inhibits writing into the field memory 52, and controls the field memory 52 so that the signals stored therein can be read out repetitively at predetermined time intervals. In consequence, the image signals corresponding to one field stored in the field memory 52 are recorded on the magnetic tape 30 repetitively for a predetermined period of time.

Figure 5:
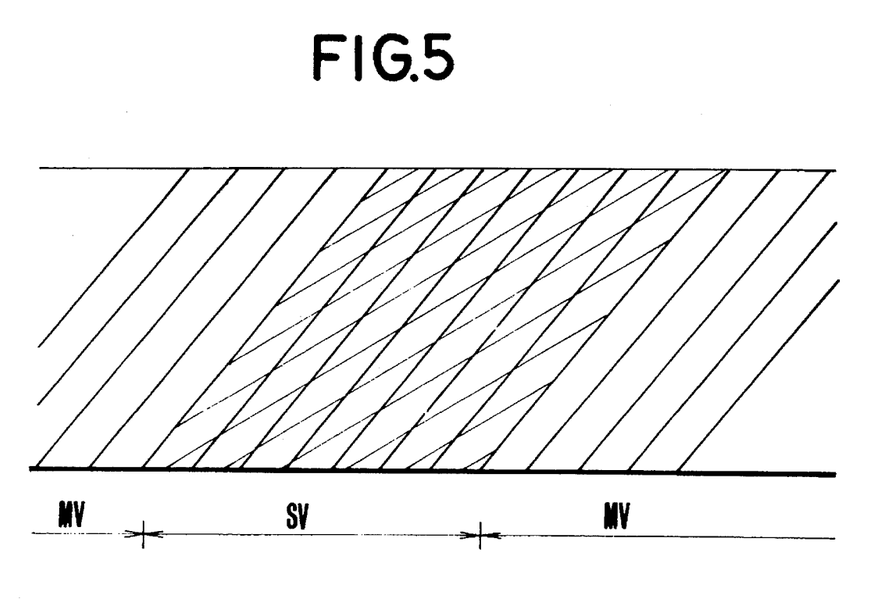
FIG. 5 is a schematic illustration of a recording pattern on a magnetic tape on the apparatus shown in FIGS. 3 and 4.

FIG. 5 shows the tracks of magnetism formed on the magnetic tape 30. An area MV is a normal motion-image recording area and an area SV represented by inclined lines is a still-image recording area in which the signals of the same field are to be recorded. The period required to record a single still image is preferably from about 1/10 to about some tens of seconds.

The following is a description of the reproducing system shown in FIG. 4. Color video signals reproduced from the magnetic tape 30 are obtained at the mixer 41. When the color image signals are applied to an ordinary type of TV monitor device through a contact a of a switch 79 and an output terminal 80, a motion image reproduced from the motion-image recording area MV or a still image reproduced from the still-image recording area SV can be viewed at the TV monitor device for the above-described predetermined period of time.

It is to be noted that signals recorded in the still-image recording area SV on the magnetic tape 30 have a 100% field correlation. Therefore, this 100% field correlation can be utilized to effect noise reduction. The circuitry which follows the mixer 41 constitutes a recursive noise reduction circuit. The noise reduction circuit is essentially constituted by a multiplier 62 having a factor k (0<k≦1), a mixer 64, an A/D converter 66 operative on the basis of a 3-$f_{sc}$ clock signal, a field memory 68, a D/A converter 70 operative on the basis of a 3-$f_{sc}$ reference clock signal supplied from a clock generating circuit 76, a multiplier 72 having a factor (1−k), a memory control circuit 74 for controlling writing to and reading from the field memory 68 and addresses therefor, the above clock generating circuit 76, an AFC circuit 78 receiving a horizontal synchronizing signal from the synchronizing signal separating circuit 38 to output a 3-$f_{sc}$ clock signal which is in phase with the horizontal synchronizing signal, and the output terminal 80.

The operation of the portion between the magnetic tape 30 and the mixer 41 is the same as that described previously in conjunction with FIG. 2. Therefore, the following explanation will be directed to the operation of the circuitry subsequent to the mixer 41.

In the normal reproduction mode, the output of the mixer 41 passes through the contact a to which the switch 79 is connected by the system controller 82, and is output through the output terminal 80 to an external circuit. Also, that output is multiplied by k in the multiplier 62 and is applied to the mixer 64. The mixer 64 mixes the signal input multiplied by k with a signal input which has been contained in the preceding field and which has been multiplied by (1−k) in the multiplier 72. The memory control circuit 74 writes the output of the A/D converter 66 into the field memory 68 on the basis of the 3-$f_{sc}$ clock signal which is in phase with the horizontal synchronizing signal of the reproduced signal. In the reading operation, the memory control circuit 74 controls the field memory 68 to output data stored therein on the 3-$f_{sc}$ reference clock signal supplied from the clock generating circuit 76. The D/A converter 70 effects analog-to-digital conversion of the output of the field memory 68 on the basis of a reference clock signal from the clock generating circuit 76, and supplies the digitized signal to the contact b of the switch 79 and to the multiplier 72. The multiplier 72 multiplies the incoming signal by (1−k) and supplies the result to the mixer 64. Noise reduction is effected by the above-described recursive operation and, particularly in the case of still images showing a close field correlation, a maximum noise reduction effect can be achieved.

If the system controller 58 inhibits writing into the field memory 52 after such noise reduction has been continued for a predetermined period of time, a good still image can be output up to the time the switch 79 has been switched from the contact b to the contact a.

In the field memory 68, data writing is performed on the basis of a clock signal which follows time-base variations, and data reading is performed on the basis of the reference clock signal from the clock generating circuit 76. Accordingly, signals provided at the output terminal 80 are free from time-base variations.

The above description refers to an illustrative example in which the still-image recording area SV is reproduced while the magnetic tape 30 is travelling. It will be appreciated, however, that since the still-image recording area SV is also recorded in a normal recording format, the still-image recording area SV can be reproduced in the "still reproduction" mode which is incorporated in a conventional type of reproducing apparatus.

For the purpose of illustration, the presently preferred embodiment employs a tape-like recording medium. However, the kind of recording medium applicable to the present invention is not limited to the above-described one. For example, a solid state memory such as a semiconductor memory or other suitable memorizing means can be used as an image memory.

Accordingly, it will be readily understood from the foregoing that, in accordance with the present invention, it is possible to effect still-image recording without the need to alter the recording format of a recording medium. Furthermore, a still image can be derived from a motion image which is being reproduced, without the need to select the "still reproduction" mode, whereby it is possible to easily view a desired still image.

What is claimed is:

1. A video signal recording apparatus, comprising:
   (a) generating means for generating a video signal as a motion image;
   (b) memory means for storing a portion of the video signal corresponding to one picture generated by said generating means;
   (c) reading means for repetitively reading out the portion of the video signal corresponding to one picture stored in said memory means as a still image;
   (d) recording means for recording a motion image and a still image on a recording medium; and
   (e) mode changing means for changing a mode of the apparatus among a plurality of modes, said plurality of modes including a first mode in which said recording means records the video signal generated by said generating means on a plurality of tracks as a motion image and a second mode in which said recording means repetitively records the portion of the video signal corresponding to one picture repetitively read out from said memory means on each of a plurality of tracks as a still image.

2. An apparatus according to claim 1, wherein said generating means includes image pick-up means for converting an optical image of an object into an electrical signal and said generating means further includes signal processing means for converting the electrical signal output from said image pick-up means into said video signal which is an analog signal of a signal format suitable for recording by said recording means.

3. An apparatus according to claim 1, wherein the portion of the video signal corresponding to the one picture repetitively read out from said memory means is an analog signal which has the same format as that of said video signal.

4. An apparatus according to claim 1, further comprising manually operable means for instructing the recording of the still image, and wherein said mode changing means changes the mode of the apparatus from said first mode to said second mode in response to operation of said manually operable means.

5. An apparatus according to claim 1, wherein said video signal contains a luminance signal and a carrier chrominance signal.

6. An apparatus according to claim 1, wherein said recording means includes a rotary head for effecting recording while forming one track for each picture portion of said video signal on the tape-shaped recording medium.

7. A video signal recording apparatus, comprising:
   a) generating means for generating a video signal as a motion image;
   b) memory means for storing a portion of said video signal corresponding to one picture generated by said generating means;

c) reading means for repetitively reading out said portion of said video signal corresponding to one picture stored in said memory means as a still image;

d) recording means for recording a motion image and said still image on a recording medium; and e) mode changing means for changing a mode of the apparatus among a plurality of modes, including a first mode in which said recording means records the video signal generated by said generating means on a predetermined area on a plurality of tracks on the recording medium as a motion image and a second mode in which the recording means repetitively records the portion of said video signal corresponding to one picture repetitively read out from said memory means on a predetermined area of another plurality of tracks on the recording medium as a still image.

8. An apparatus according to claim 7, wherein said generating means includes image pick-up means for converting an optical image of an object into an electrical signal.

9. An apparatus according to claim 8, wherein said generating means further includes signal processing means for converting the electrical signal output from said image pick-up means into said video signal which is an analog signal of a signal format for recording by said recording means.

10. An apparatus according to claim 7, wherein said portion of said video signal corresponding to one picture repetitively read out from said memory means is an analog signal which has the same format as that of said video signal.

11. An apparatus according to claim 7, further comprising manually operable means for instructing the recording of the still image, and wherein said mode changing means changes the mode of the apparatus from said first mode to said second mode in response to operation of said manually operable means.

12. An apparatus according to claim 7, further comprising manually operable means for instructing the recording of a still image.

13. An apparatus according to claim 7, wherein the recording medium includes a magnetic tape, and wherein said recording means includes rotary heads for forming the plurality of tracks on the magnetic tape to record the motion image and still image.

14. A video signal recording apparatus, comprising:

(a) generating means for generating a video signal as a motion image;

(b) memory means for storing a portion of said video signal corresponding to one picture generated by said generating means;

(c) reading means for repetitively reading out said portion of said video signal corresponding to one picture stored in said memory means as a still image;

(d) manually operable means for instructing the recording of a still image;

(e) recording means for recording a motion image and a still image on a recording medium; and (f) control means for controlling said recording means to repetitively record said portion of said video signal corresponding to one picture repetitively read out from said memory means on each of a plurality of tracks as a still image in response to the operation of said manually operable means.

15. An apparatus according to claim 14, wherein said generating means includes image pick-up means for converting an optical image of an object into an electrical signal and said generating means further includes signal processing means for converting the electrical signal output from said image pick-up means into said video signal.

16. An apparatus according to claim 14, wherein said portion of said video signal corresponding to one picture repetitively read out from said memory means and said video signal have a common format.

17. An apparatus according to claim 14, wherein said recording means includes a rotary head effecting recording while forming one track for each picture portion of said video signal on the recording medium.

18. A video signal recording apparatus, comprising:

a) generating means for generating a video signal as a motion image;

b) memory means or storing a portion of the video signal corresponding to one picture generated by said generating means;

c) reading means for repetitively reading out the portion of the video signal corresponding to one picture stored in said memory means as a still image;

d) recording means for recording a motion image and a still image on a recording medium; and e) mode changing means for changing a mode of the apparatus among a plurality of modes, including a first mode in which said recording means records the video signal generated by said generating means with a predetermined extension on a plurality of tracks on the recording medium as a motion image, and a second mode in which said recording means repetitively records the portion of the video signal corresponding to one picture repetitively read out from said memory means with the predetermined extension on another plurality of tracks on the recording medium as a still image.

19. An apparatus according to claim 18, further comprising manually operable means for instructing the recording of a still image.

20. An apparatus according to claim 18, wherein the recording medium includes a magnetic tape, and wherein said recording means includes rotary heads for forming the plurality of tracks on the magnetic tape to record the motion image and still image.

* * * * *

UNITED STATES PATENT AND TRADEMARK OFFICE
CERTIFICATE OF CORRECTION

PATENT NO. : 5,585,934
DATED : December 17, 1996
INVENTOR(S) : Yoshimura et al.

It is certified that error appears in the above-identified patent and that said Letters Patent are hereby corrected as shown below:

Col. 2, line 49, delete "On" and insert -- on --.

Signed and Sealed this

Twenty-sixth Day of May, 1998

Attest:

BRUCE LEHMAN

Attesting Officer

Commissioner of Patents and Trademarks